(12) United States Patent
Xie et al.

(10) Patent No.: US 12,409,463 B2
(45) Date of Patent: Sep. 9, 2025

(54) SHOWER SYSTEM HAVING OPERATING HANDLE

(71) Applicant: Protech (Xiamen) Industry Co., Ltd., Fujian (CN)

(72) Inventors: Pengwei Xie, Xiamen (CN); Mingqiang Yan, Xiamen (CN); Zehe Xie, Xiamen (CN)

(73) Assignee: Protech (Xiamen) Industry Co., Ltd., Xiamen (CN)

( * ) Notice: Subject to any disclaimer, the term of this patent is extended or adjusted under 35 U.S.C. 154(b) by 349 days.

(21) Appl. No.: 18/098,693

(22) Filed: Jan. 19, 2023

(65) Prior Publication Data
US 2024/0123456 A1  Apr. 18, 2024

(30) Foreign Application Priority Data
Oct. 12, 2022  (CN) .......................... 202222689731.4

(51) Int. Cl.
*B05B 1/18* (2006.01)
*B05B 1/16* (2006.01)
*E03C 1/04* (2006.01)

(52) U.S. Cl.
CPC ............ *B05B 1/185* (2013.01); *B05B 1/1681* (2013.01); *E03C 1/0409* (2013.01)

(58) Field of Classification Search
CPC ........ E03C 1/0409; E03C 1/0408; E03C 1/06; B05B 1/185; B05B 1/1681
See application file for complete search history.

(56) References Cited

U.S. PATENT DOCUMENTS

| | | | |
|---|---|---|---|
| 7,900,295 B2* | 3/2011 | Lev | B05B 15/62 4/615 |
| 7,937,784 B2* | 5/2011 | Qiu | B05B 1/18 4/615 |
| 9,149,817 B2* | 10/2015 | Lev | E03C 1/0408 |
| 10,245,610 B2* | 4/2019 | Johnson | B05B 1/18 |
| 10,821,449 B2* | 11/2020 | Lin | E03C 1/0409 |
| 12,091,846 B2* | 9/2024 | Xie | E03C 1/06 |

* cited by examiner

*Primary Examiner* — Erin Deery
(74) *Attorney, Agent, or Firm* — Birchwood IP

(57) ABSTRACT

A shower system having an operating handle includes a positioning member, a ball joint, an overhead shower head, and a control mechanism. The positioning member has a water supply passage therein. The overhead shower head has an inlet end pivotally connected to the ball joint. The overhead shower head includes a handle portion protruding from a surface of the overhead shower head. The control mechanism is disposed on the handle portion and configured to control the inlet end of the overhead shower head to be in communication with an outlet end of the overhead shower head. The shower system is suitable for users of different heights, easy to operate, simple in structure and low in cost.

12 Claims, 7 Drawing Sheets

SHOWER SYSTEM HAVING OPERATING HANDLE

BACKGROUND OF THE INVENTION

1. Field of the Invention

The present invention relates to an overhead shower head, and more particularly, to a shower system having an operating handle.

2. Description of the Prior Art

Shower heads usually include hand-held shower heads and overhead shower heads. Because the overhead shower head is usually higher than the user's head and the spray area of the overhead shower head is larger, it is widely used in houses, hotels and other places. The overhead shower head is generally installed on the top of a shower rod through a ball joint, so as to adjust the angle of the overhead shower head for taking a shower. However, the installation height of most overhead shower heads is fixed, which makes it difficult for some shorter users to adjust the angle of the overhead shower head.

In order to solve the above problem, an electronically-controlled or mechanically-controlled adjustment mechanism is provided between the lower end of the shower rod and the overhead shower head. Chinese Utility Model Publication No. CN214021617U discloses a pressurized overhead shower head 3 with an angle adjustment mechanism, comprising a water pipe 1 and a switch 2, as shown in FIG. 1. A regulator 3 is fixedly connected to the outer bottom end of the water pipe 1. A driven bevel gear rotating shaft is rotatably connected to the inner side of the regulator 3. The outer side of the driven bevel gear rotating shaft meshes with a driving bevel gear. When in use, through a steel rope 6, the driven bevel gear rotating shaft, a rotating ring and a spring, in cooperation with the rotating connection between the steel rope 6 and the driven bevel gear rotating shaft, the sliding connection between the rotating ring and the overhead shower head 8, and the fixed connection between the spring and the top seat, the user can turn the driving bevel gear at the lower half of the water pipe. The steel rope 6 is pulled by the driven bevel gear rotating shaft meshed on the outside to adjust the position on the outside of the driven bevel gear rotating shaft, and the rotating ring is pulled to control and adjust the rotation of the overhead shower head 8, thereby changing the angle of the overhead shower head to spray water. In practical applications, the above-mentioned patent has the problems of complex structure, troublesome disassembly and assembly, and high cost. Because the overhead shower head is used in humid environments, such as bathrooms, the metal parts in the adjustment mechanism are prone to rust, resulting in poor operating feel of the product after a long period of use.

SUMMARY OF THE INVENTION

The primary object of the present invention is to provide a shower system having an operating handle. The shower system is suitable for users of different heights, easy to operate, simple in structure and low in cost.

In order to achieve the above object, the present invention adopts the following technical solutions:

A shower system having an operating handle comprises a positioning member, a ball joint, an overhead shower head, and a control mechanism. The positioning member has a water supply passage therein. The ball joint is installed at an outlet end of the water supply passage. The overhead shower head has an inlet end pivotally connected to the ball joint. The overhead shower head includes a handle portion protruding from a surface of the overhead shower head. The control mechanism is disposed on the handle portion and configured to control the inlet end of the overhead shower head to be in communication with an outlet end of the overhead shower head.

The inlet end and the outlet end of the overhead shower head are disposed on upper and lower surfaces of the overhead shower head, respectively. The handle portion is disposed on a peripheral surface of the overhead shower head. The overhead shower head has an inlet passage and an outlet passage therein. Two ends of the inlet passage are in communication with the inlet end of the overhead shower head and an inlet end of the control mechanism, respectively. Two ends of the outlet passage are in communication with the outlet end of the overhead shower head and an outlet end of the control mechanism, respectively.

Preferably, the handle portion is a hollow structure. The inlet passage and the outlet passage are in communication with the control mechanism through water pipes.

Preferably, the handle portion is detachably connected to the overhead shower head.

Preferably, the shower system further comprises a hand-held shower head. An inlet end of the hand-held shower head is in communication with the outlet end of the control mechanism.

Preferably, a holder for holding the hand-held shower head is disposed on the handle portion.

Preferably, the control mechanism includes a valve body assembly, a main valve core, and a first switching valve core. The valve body assembly is installed in the handle portion. The valve body assembly has a water passage, a first branch water passage and a second branch water passage. An inlet end of the water passage is in communication with an outlet end of the inlet passage. An outlet end of the water passage is in communication with inlet ends of the first branch water passage and the second branch water passage. An outlet end of the first branch water passage is in communication with the hand-held shower head. An outlet end of the second branch water passage is in communication with an inlet end of the outlet passage. The main valve core is disposed on the water passage. The first switching valve core is disposed at a junction of the water passage, the first branch water passage and the second branch water passage.

Preferably, the control mechanism further includes a second switching valve core. The valve body assembly further has a third branch water passage and a fourth branch water passage. Inlet ends of the third branch water passage and the fourth branch water passage are in communication with the outlet end of the second branch water passage. The overhead shower head has two water chambers. The water chamber has a plurality of water outlets on the outlet end of the overhead shower head. Outlet ends of the third branch water passage and the fourth branch water passage are in communication with the two water chambers, respectively. The second switching valve core is disposed at a junction of the second branch water passage, the third branch water passage and the fourth branch water passage.

Preferably, the control mechanism further includes buttons disposed on operation ends of the main valve core, the first switching valve core and the second switching valve core.

Preferably, the valve body assembly includes a first valve body, a second valve body and a third valve body that are connected sequentially in an upper-to-lower direction. The first valve body has an upper end face formed with a first inlet, a first outlet and a second outlet, a lower end face formed with a second inlet and a third outlet, and one side formed with a first water channel. The first inlet communicates with the third outlet. The first outlet, the second outlet and the second inlet communicate with the first water channel. The first water channel is configured to install the second switching valve core. The second valve body has an upper end face formed with a third inlet and a fourth outlet, a lower end face formed with a fourth inlet, a fifth outlet and a sixth outlet, and one side formed with a second water channel. The third inlet communicates with the fifth outlet. The fourth outlet, the fourth inlet and the sixth outlet communicate with the second water channel. The second water channel is configured to install the first switching valve core. The third valve body has an upper end face formed with a fifth inlet, a sixth inlet and a seventh outlet, a lower end face formed with an eighth outlet, and one side formed with a third water channel. The fifth inlet and the seventh outlet communicate with the third water channel, the sixth inlet communicates with the eighth outlet. The third water channel is configured to install the main valve core.

Preferably, the first inlet, the third outlet, the third inlet, the fifth outlet, the fifth inlet, the third water channel, the seventh outlet, the fourth inlet and the second water channel are in communication with one another in sequence to form the water passage. The second water channel, the sixth outlet, the sixth inlet and the eighth outlet are in communication with one another to form the first branch water passage. The second water channel, the fourth outlet, the second inlet and the first water channel are in communication with one another to form the second branch water passage. The first water channel is in communication with the first outlet to form the third branch water passage. The first water channel is in communication with the second outlet to form the forth branch water passage.

The control mechanism is disposed on the handle portion close to a bottom end of the handle portion.

The positioning member includes a positioning seat fixedly connected to a wall and a water supply pipe connected to the positioning seat. The ball joint is threadedly connected to an outlet end of the water supply pipe.

After adopting the above technical solutions, the present invention has the following technical effects:

1. The overhead shower head is secured on the wall through the positioning member. Between the overhead shower head and the wall, only the positioning member is required. The ball joint as a pivot point is provided between the overhead shower head and the positioning member. The handle portion protrudes out from the overhead shower head. The handle portion extends downward so that the user can grasp it to adjust the angle of the overhead shower head. The handle portion can be easily operated for users with insufficient height or inconvenience. The user experience is good.
2. The present invention does not need additional devices, such as a shower rod and an adjustment mechanism while realizing the installation and adjustment of the overhead shower head. The structure is simplified greatly. The assembly is easy. The cost is reduced. The present invention has market competitiveness.

DETAILED DESCRIPTION OF THE PREFERRED EMBODIMENTS

Figure 1:
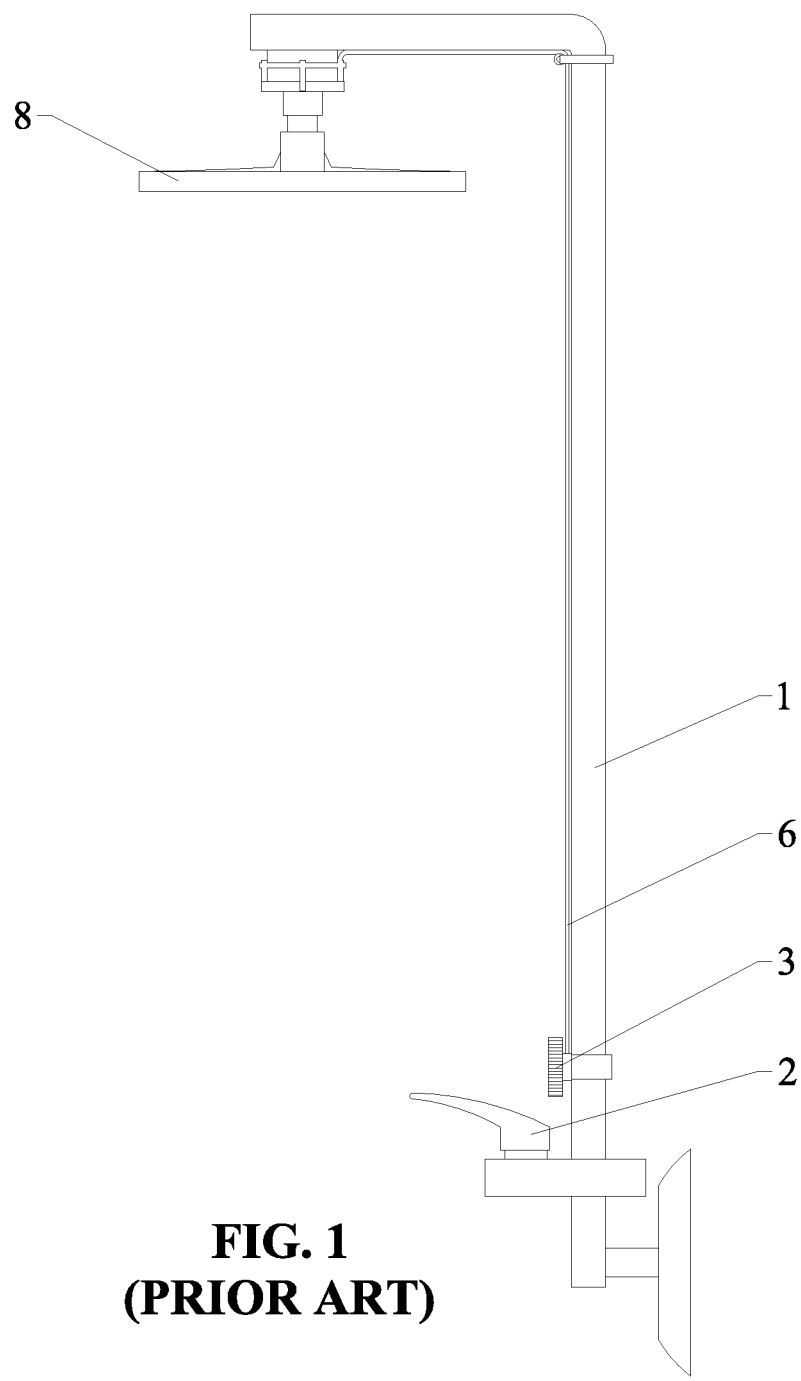
FIG. 1 is a schematic view of the pressurized overhead shower head as disclosed in Chinese Utility Model Publication No. CN214021617U.
Figure 2:
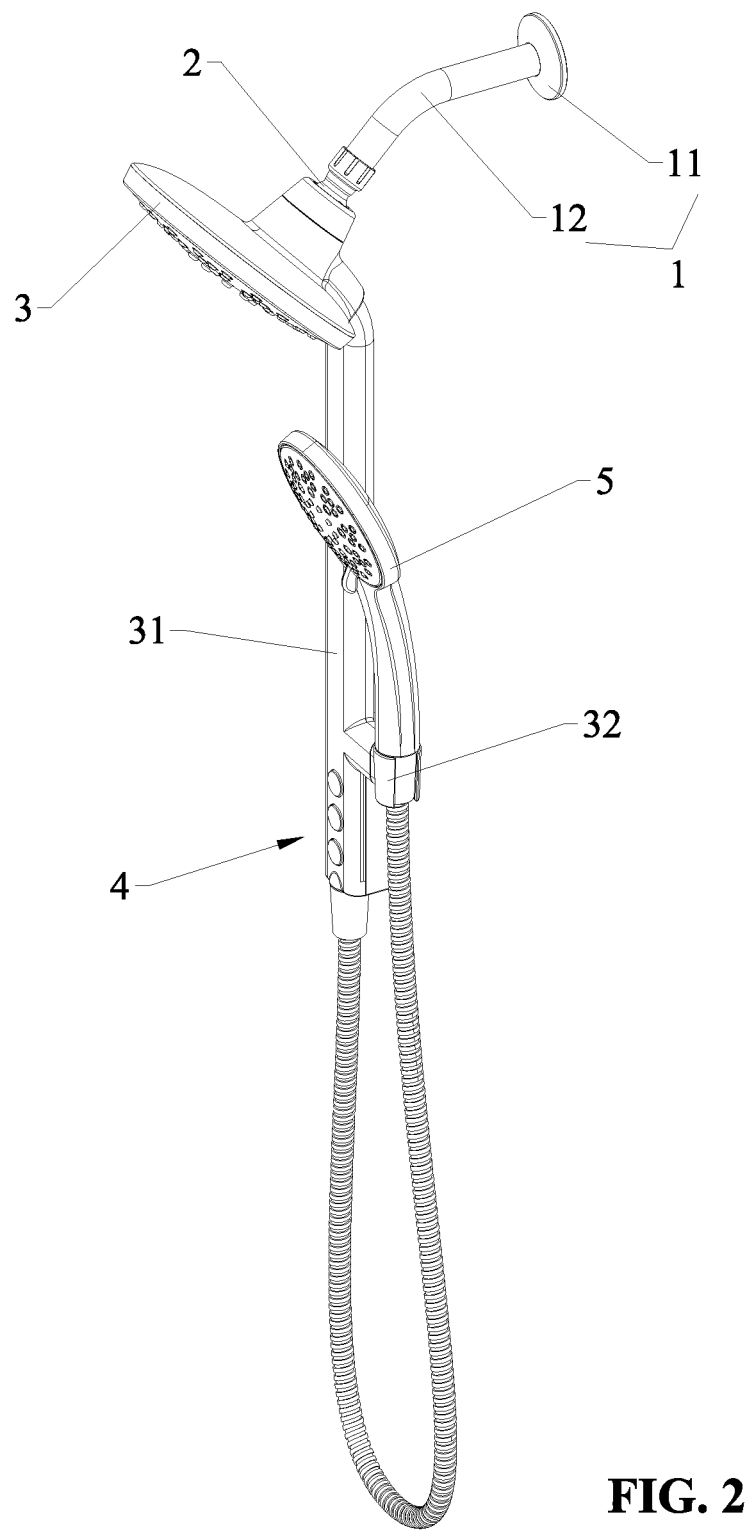
FIG. 2 is a perspective view in accordance with a preferred embodiment of the present invention.

Embodiments of the present invention will now be described, by way of example only, with reference to the accompanying drawings.

Referring to FIGS. 2 to 7, the present invention discloses a shower system having an operating handle, comprising a positioning member 1, a ball joint 2, an overhead shower head 3 and a control mechanism 4.

The positioning member 1 is fixedly installed on the wall. The positioning member 1 has a water supply passage a communicating with a water supply end.

The ball joint 2 is installed at an outlet end of the water supply passage a.

An inlet end of the overhead shower head 3 is pivotally connected to the ball joint 2. The overhead shower head 3 includes a handle portion 31 protruding from the surface of the overhead shower head 3 for the user to operate and adjust the angle of the overhead shower head 3.

The control mechanism 4 is disposed on the handle portion 31 and configured to control the inlet end of the overhead shower head 3 to be in communication with an outlet end of the overhead shower head 3.

Specific embodiments of the present invention are shown below.

The water supply end refers to the water pipe pre-buried in the wall.

The positioning member 1 includes a positioning seat 11 fixedly connected to the wall and a water supply pipe 12 connected to the positioning seat 11. The water supply passage a is defined in the water supply pipe 12. The ball joint 2 is threadedly connected to an outlet end of the water supply pipe 12.

Figure 3:
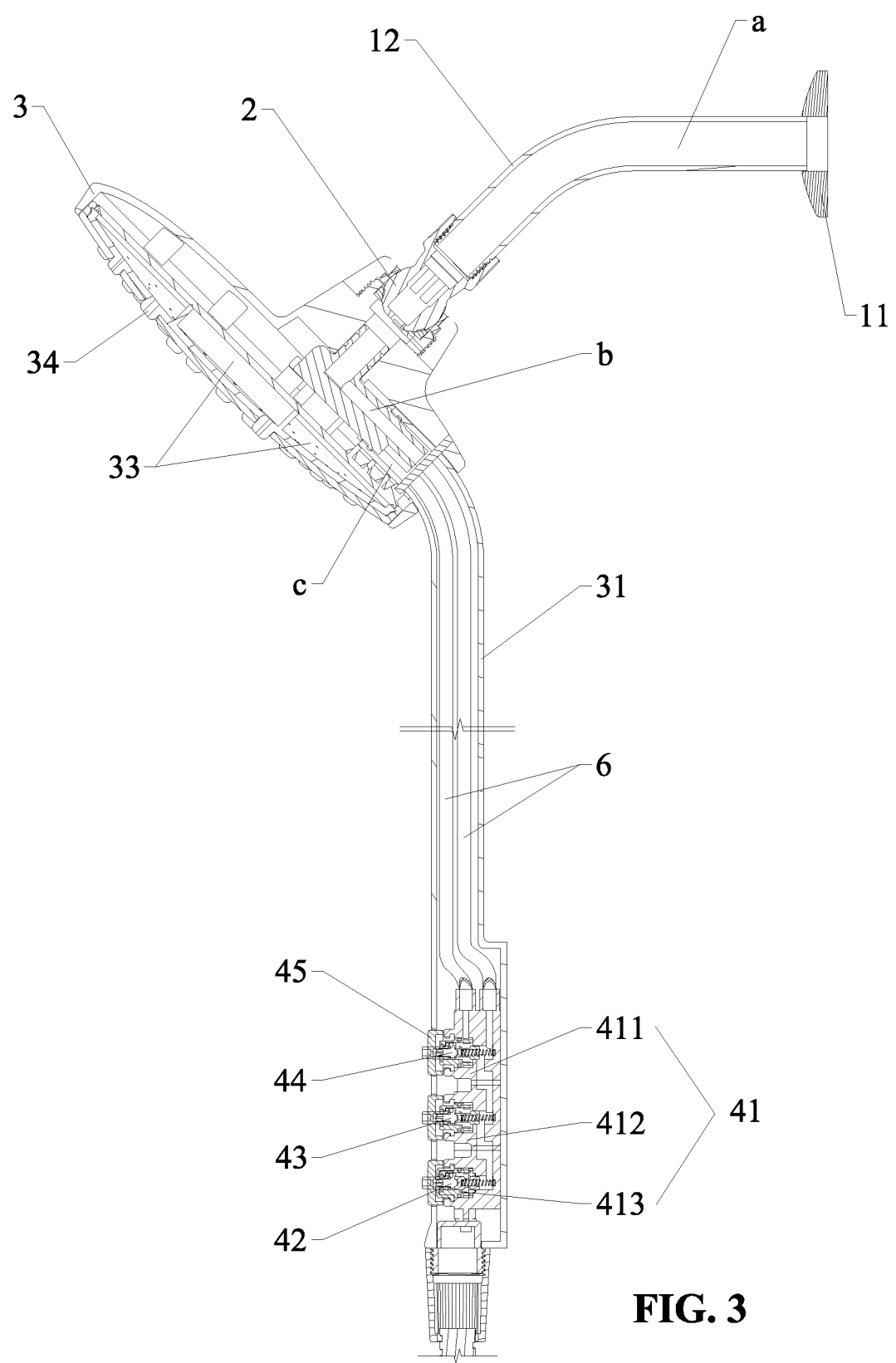
FIG. 3 is a cross-sectional view in accordance with the preferred embodiment of the present invention.
Figure 4:
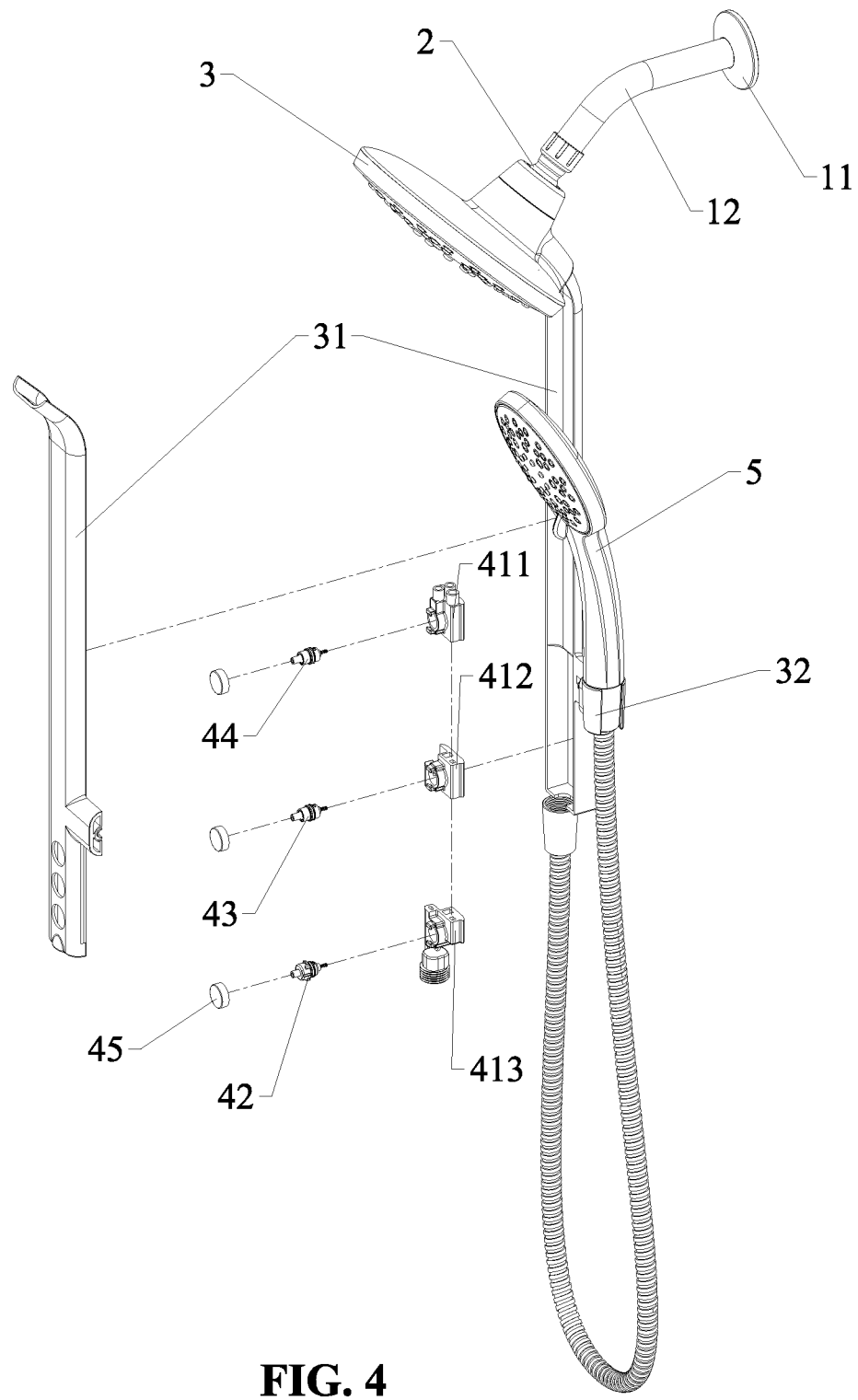
FIG. 4 is an exploded view in accordance with the preferred embodiment of the present invention.

The inlet end of the overhead shower head 3 refers to the end communicating with the ball joint 2. The outlet end of the overhead shower head 3 refers to the front panel of the overhead shower head 3. In this embodiment, the inlet end and the outlet end of the overhead shower head 3 are disposed on the upper and lower surfaces of the overhead shower head 3, respectively. The handle portion 31 is disposed on the peripheral surface of the overhead shower head 3. Referring to FIG. 3, the overhead shower head 3 has an inlet passage b and an outlet passage c therein. Two ends of the inlet passage b are in communication with the inlet end of the overhead shower head 3 and an inlet end of the control mechanism 4, respectively. Two ends of the outlet passage c are in communication with the outlet end of the overhead shower head 3 and an outlet end of the control mechanism 4, respectively. When water flows to the overhead shower head 3, the water first flows to the control mechanism 4 of the handle portion 31, and the control mechanism 4 controls the opening and closing of the water passage or the distribution of the water passage. After that, the water flows to the outlet passage c, and is sprayed out from the front panel of the overhead shower head 3. The control mechanism 4 is located on the handle portion 31 of the overhead shower head 3. It is convenient for the user to operate the control mechanism 4 to turn on/off or switch the water passages.

Further, as shown in FIG. 3, the handle portion 31 is a hollow structure. Both the inlet passage b and the outlet passage c are in communication with the control mechanism 4 through water pipes 6. Using the water pipes 6 to communicate with the overhead shower head 3 and the control mechanism 4 makes the processing of the various components (such as the overhead shower head 3 and its handle portion 31) of the present invention easier. The handle portion 31 may be a detachable structure relative to the body portion of the overhead shower head 3. Because the handle portion 31 is long and is a force-bearing mechanism, it is relatively easy to be damaged in use. The detachable handle portion 31 can be disassembled and replaced with a new one with ease. In terms of the fitting structure, the handle portion 31 can be disassembled and assembled with the body portion of the overhead shower head 3 by a threaded connection, snap ring connection, snap-fit connection, and the like.

The present invention further comprises a hand-held shower head 5. An inlet end of the hand-held shower head 5 is in communication with the outlet end of the control mechanism 4. The control mechanism 4 has a plurality of water passages, that is, a plurality of outlet ends, so as to supply water to the overhead shower head 3 and the hand-held shower head 5 respectively. The control mechanism 4 is configured to control the opening and closing of the water passages and the switching of the water passages between the overhead shower head 3 and the hand-held shower head 5. The arrangement of the hand-held shower head 5 enhances the functions and usage of the shower system. The user can select the overhead shower head 3 with a fixed relative position or the hand-held shower head 5 with an unfixed relative position to take a shower as desired. A holder 32 having a C-shaped opening for holding the hand-held shower head 5 is disposed on the handle portion 31, so that the hand-held shower head 5 can be directly hung on the handle portion 31 when not in use or if necessary.

Figure 5:
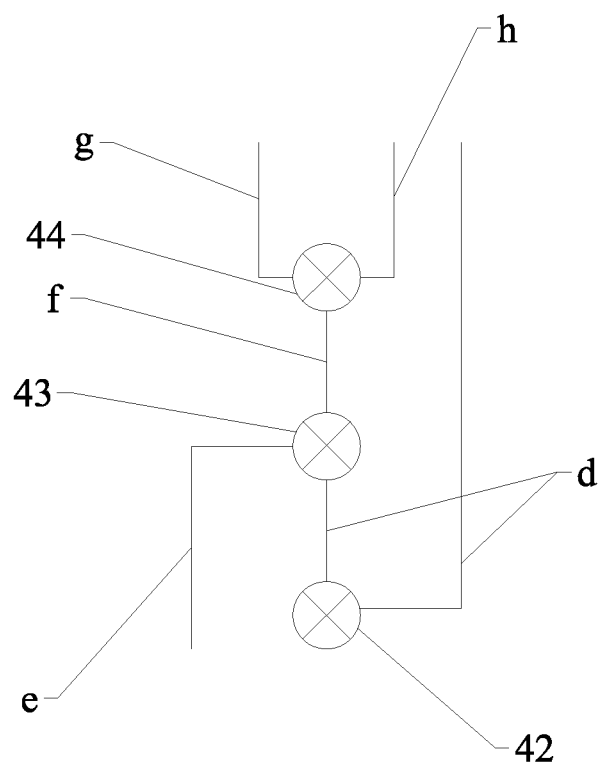
FIG. 5 is a schematic view illustrating the water passages of the control mechanism of the present invention.

Furthermore, as shown in FIG. 5, the control mechanism 4 includes a valve body assembly 41, a main valve core 42, and a first switching valve core 43. The valve body assembly 41 is installed in the handle portion 31. The valve body assembly 41 has a water passage d, a first branch water passage e and a second branch water passage f. An inlet end of the water passage d is in communication with an outlet end of the inlet passage b. An outlet end of the water passage d is in communication with inlet ends of the first branch water passage and the second branch water passage. An outlet end of the first branch water passage e is in communication with the hand-held shower head 5. An outlet end of the second branch water passage f is in communication with an inlet end of the outlet passage c. The main valve core 42 is disposed on the water passage d and configured to control the opening and closing of the water passage, serving as the main switch of the water passage. The first switching valve core 43 is disposed at the junction of the water passage d, the first branch water passage e and the second branch water passage f, and is configured to distribute the water flow to the overhead shower head 3 or the hand-held shower head 5 for switching the spray modes of the overhead shower head 3 and the hand-held shower head 5.

Finally, the control mechanism 4 further includes a second switching valve core 44. The valve body assembly 41 further has a third branch water passage g and a fourth branch water passage h. Respective inlet ends of the third branch water passage g and the fourth branch water passage h are in communication with the outlet end of the second branch water passage f. The overhead shower head 3 has two water chambers 33. The water chamber 33 has a plurality of water outlets 34 on the outlet end (i.e., the front panel) of the overhead shower head 3. The water outlets 34 of the two water chambers 33 correspond to different spray modes. Outlet ends of the third branch water passage g and the fourth branch water passage h are in communication with the two water chambers 33, respectively. The second switching valve core 44 is disposed at the junction of the second branch water passage f, the third branch water passage g and the fourth branch water passage h, and is configured to distribute the water flow to one of the water chambers 33 for switching the spray modes of the overhead shower head 3. In addition, the control mechanism 4 further includes buttons 45 disposed on operation ends of the main valve core 42, the first switching valve core 43 and the second switching valve core 44, so that the user can press one of the valve cores to realize the opening and closing of the corresponding water passage and switching functions.

Figure 6:
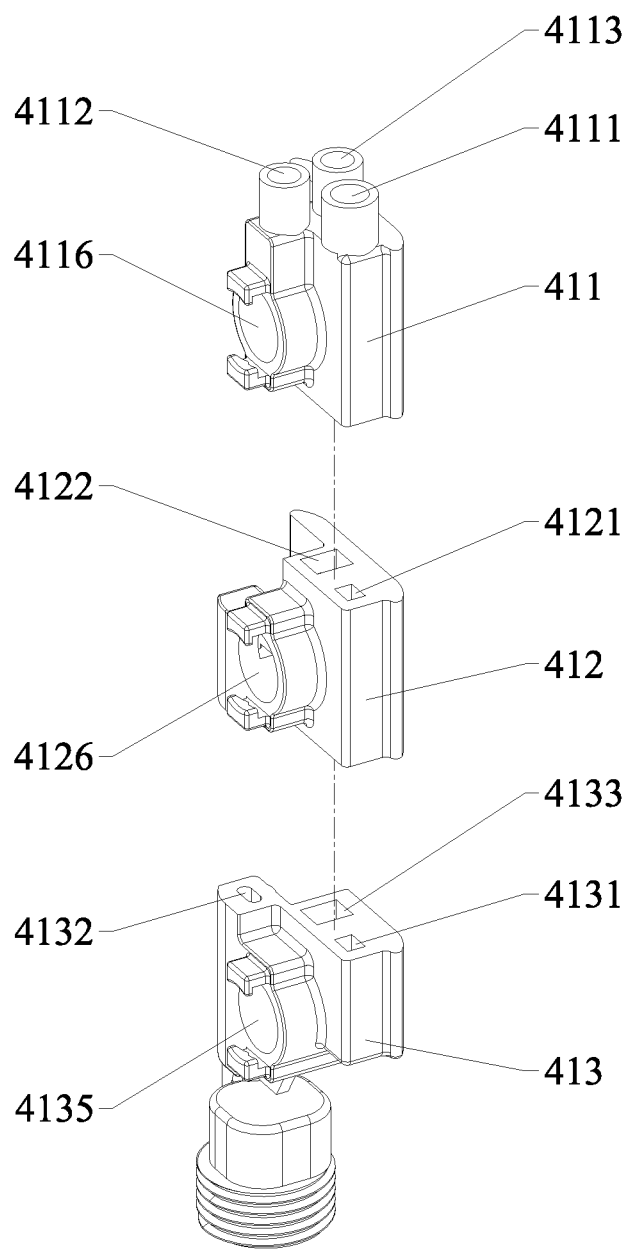
FIG. 6 is a first exploded view of the valve body assembly in accordance with the preferred embodiment of the present invention.
Figure 7:
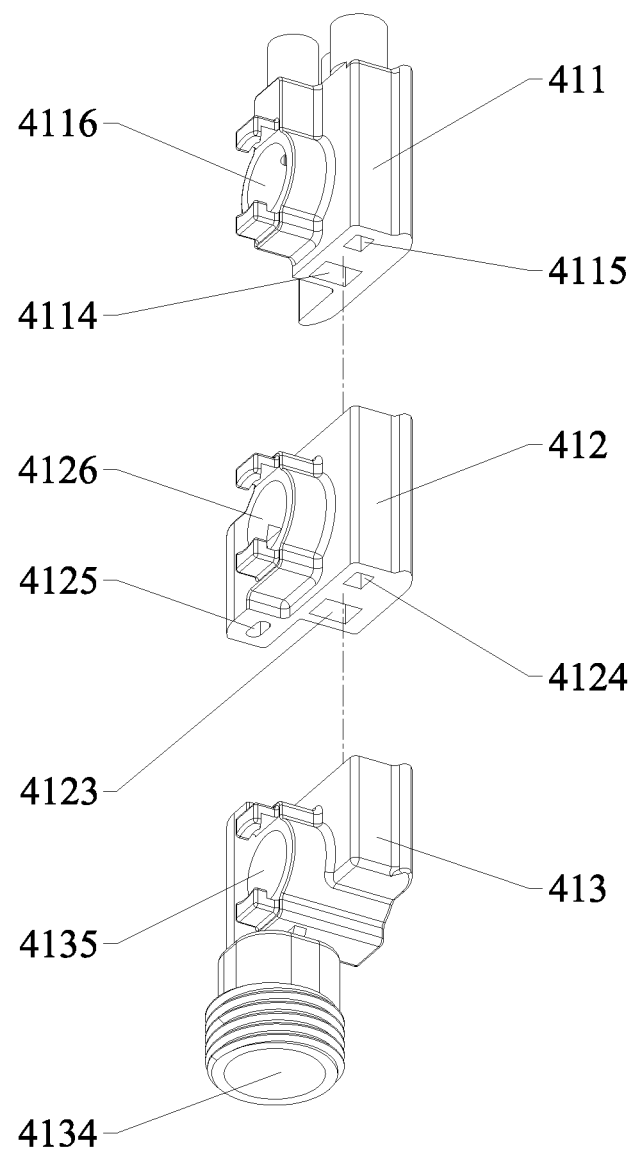
FIG. 7 is a second exploded view of the valve body assembly in accordance with the preferred embodiment of the present invention.

Referring to FIG. 6 and FIG. 7, in some embodiments of the control mechanism 4, the valve body assembly 41 includes a first valve body 411, a second valve body 412 and a third valve body 413 that are connected sequentially in an upper-to-lower direction. The first valve body 411 has an upper end face formed with a first inlet 4111, a first outlet 4112 and a second outlet 4113, a lower end face formed with a second inlet 4114 and a third outlet 4115, and one side formed with a first water channel 4116. The first inlet 4111 communicates with the third outlet 4115. The first outlet 4112, the second outlet 4113 and the second inlet 4114 communicate with the first water channel 4116. The first water channel 4116 is configured to install the second switching valve core 44. The second valve body 412 has an upper end face formed with a third inlet 4121 and a fourth outlet 4122, a lower end face formed with a fourth inlet 4123, a fifth outlet 4124 and a sixth outlet 4125, and one side formed with a second water channel 4126. The third inlet 4121 communicates with the fifth outlet 4124. The fourth outlet 4122, the fourth inlet 4123 and the sixth outlet 4125 communicate with the second water channel 4126. The second water channel 4126 is configured to install the first switching valve core 43. The third valve body 413 has an upper end face formed with a fifth inlet 4131, a sixth inlet 4132 and a seventh outlet 4133, a lower end face formed with an eighth outlet 4134, and one side formed with a third water channel 4135. The fifth inlet 4131 and the seventh outlet 4133 communicate with the third water channel 4135. The sixth inlet 4132 communicates with the eighth outlet 4134. The third water channel 4135 is configured to install the main valve core 42. The first inlet 4111, the third outlet 4115, the third inlet 4121, the fifth outlet 4124, the fifth inlet 4131, the third water channel 4135, the seventh outlet 4133, the fourth inlet 4123 and the second water channel 4126 are in communication with one another in sequence to form the water passage d. The second water channel 4126, the sixth outlet 4125, the sixth inlet 4132 and the eighth outlet 4134 are in communication with one another to form the first branch water passage e. The second water channel 4126, the fourth outlet 4122, the second inlet 4114 and the first water channel 4116 are in communication with one another to form the second branch water passage f. The first water channel 4116 is in communication with the first outlet 4112 to form the third branch water passage g. The first water channel 4116 is in communication with the second outlet 4113 to form the forth branch water passage h. In the structure described in this paragraph, the valve body assembly 41 includes three small valve bodies connected in parallel, which can simplify the mold design of the parts and make demolding easier in production, so as to reduce costs and improve production quality and efficiency. The control mechanism 4 is disposed on the handle portion 31 close to the bottom end of the handle portion 31.

The control mechanism 4 is closer to the ground, and is easier to operate for a user who is short in height, such as a child.

With the above solution, in the present invention, the overhead shower head 3 is secured on the wall through the positioning member 1. Between the overhead shower head 3 and the wall, only the positioning member 1 is required. The ball joint 2 as a pivot point is provided between the overhead shower head 3 and the positioning member 1. The handle portion 31 protrudes out from the overhead shower head 3. The handle portion 31 extends downward so that the user can grasp it to adjust the angle of the overhead shower head 3. The handle portion 31 can be easily operated for users with insufficient height or inconvenience. The user experience is good. The present invention does not need additional devices, such as a shower rod and an adjustment mechanism while realizing the installation and adjustment of the overhead shower head. The structure is simplified greatly. The assembly is easy. The cost is reduced. The present invention has market competitiveness.

What is claimed is:

1. A shower system having an operating handle, comprising a positioning member, a ball joint, an overhead shower head and a control mechanism;

the positioning member having a water supply passage therein;

the ball joint being installed at an outlet end of the water supply passage;

the overhead shower head having an inlet end pivotally connected to the ball joint, the overhead shower head including a handle portion protruding from a surface of the overhead shower head;

the control mechanism being disposed on the handle portion and configured to control the inlet end of the overhead shower head to be in communication with an outlet end of the overhead shower head;

the inlet end and the outlet end of the overhead shower head are disposed on upper and lower surfaces of the overhead shower head respectively, the handle portion is disposed on a peripheral surface of the overhead shower head;

the overhead shower head has an inlet passage and an outlet passage therein, two ends of the inlet passage are in communication with the inlet end of the overhead shower head and an inlet end of the control mechanism respectively, and two ends of the outlet passage are in communication with the outlet end of the overhead shower head and an outlet end of the control mechanism, respectively.

2. The shower system as claimed in claim 1, wherein the handle portion is a hollow structure, and the inlet passage and the outlet passage are in communication with the control mechanism through water pipes.

3. The shower system as claimed in claim 2, wherein the handle portion is detachably connected to the overhead shower head.

4. The shower system as claimed in claim 2, further comprising a hand-held shower head, an inlet end of the hand-held shower head being in communication with the outlet end of the control mechanism.

5. The shower system as claimed in claim 4, wherein a holder for holding the hand-held shower head is disposed on the handle portion.

6. The shower system as claimed in claim 4, wherein the control mechanism includes a valve body assembly, a main valve core, and a first switching valve core;

the valve body assembly is installed in the handle portion, the valve body assembly has a water passage, a first branch water passage and a second branch water passage;

an inlet end of the water passage is in communication with an outlet end of the inlet passage, an outlet end of the water passage is in communication with inlet ends of the first branch water passage and the second branch water passage;

an outlet end of the first branch water passage is in communication with the hand-held shower head;

an outlet end of the second branch water passage is in communication with an inlet end of the outlet passage;

the main valve core is disposed on the water passage;

the first switching valve core is disposed at a junction of the water passage, the first branch water passage and the second branch water passage.

7. The shower system as claimed in claim 6, wherein the control mechanism further includes a second switching valve core;

the valve body assembly further has a third branch water passage and a fourth branch water passage;

inlet ends of the third branch water passage and the fourth branch water passage are in communication with the outlet end of the second branch water passage;

the overhead shower head has two water chambers, the water chamber has a plurality of water outlets on the outlet end of the overhead shower head, outlet ends of the third branch water passage and the fourth branch water passage are in communication with the two water chambers, respectively;

the second switching valve core is disposed at a junction of the second branch water passage, the third branch water passage and the fourth branch water passage.

8. The shower system as claimed in claim 7, wherein the control mechanism further includes buttons disposed on operation ends of the main valve core, the first switching valve core and the second switching valve core.

9. The shower system as claimed in claim 7, wherein the valve body assembly includes a first valve body, a second valve body and a third valve body that are connected sequentially in an upper-to-lower direction;

the first valve body has an upper end face formed with a first inlet, a first outlet and a second outlet, a lower end face formed with a second inlet and a third outlet, and one side formed with a first water channel; the first inlet communicates with the third outlet, the first outlet, the second outlet and the second inlet communicate with the first water channel, the first water channel is configured to install the second switching valve core;

the second valve body has an upper end face formed with a third inlet and a fourth outlet, a lower end face formed with a fourth inlet, a fifth outlet and a sixth outlet, and one side formed with a second water channel; the third inlet communicates with the fifth outlet, the fourth outlet, the fourth inlet and the sixth outlet communicate with the second water channel, the second water channel is configured to install the first switching valve core;

the third valve body has an upper end face formed with a fifth inlet, a sixth inlet and a seventh outlet, a lower end face formed with an eighth outlet, and one side formed with a third water channel; the fifth inlet and the seventh outlet communicate with the third water channel, the sixth inlet communicates with the eighth outlet, the third water channel is configured to install the main valve core.

10. The shower system as claimed in claim 9, wherein the first inlet, the third outlet, the third inlet, the fifth outlet, the fifth inlet, the third water channel, the seventh outlet, the fourth inlet and the second water channel are in communication with one another in sequence to form the water passage;

the second water channel, the sixth outlet, the sixth inlet and the eighth outlet are in communication with one another to form the first branch water passage;

the second water channel, the fourth outlet, the second inlet and the first water channel are in communication with one another to form the second branch water passage;

the first water channel is in communication with the first outlet to form the third branch water passage;

the first water channel is in communication with the second outlet to form the forth branch water passage.

11. The shower system as claimed in claim 1, wherein the control mechanism is disposed on the handle portion proximal to a bottom end of the handle portion.

12. The shower system as claimed in claim 1, wherein the positioning member includes a positioning seat fixedly connected to a wall and a water supply pipe connected to the positioning seat, and the ball joint is threadedly connected to an outlet end of the water supply pipe.

\* \* \* \* \*